United States Patent Office 2,800,800
Patented July 30, 1957

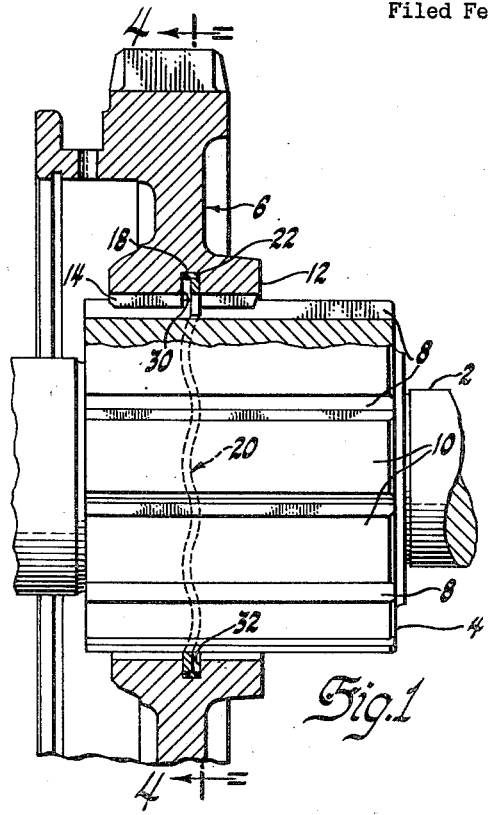
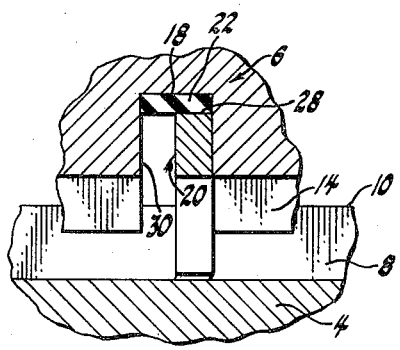
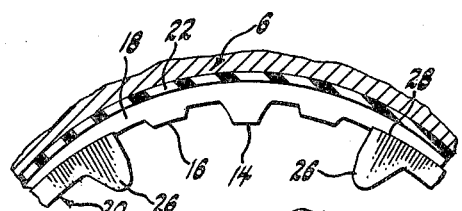
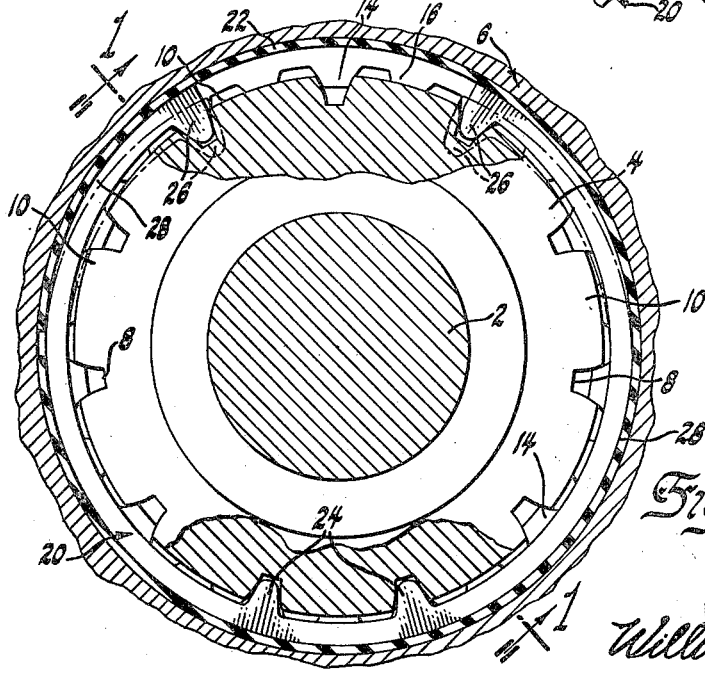

2,800,800

ANTI-RATTLE DEVICE

Raymond E. Dunn, Birmingham, Mich., assignor to General Motors Corporation, Detroit, Mich., a corporation of Delaware Application February 11, 1953, Serial No. 336,361

10 Claims. (Cl. 74—325)

This invention relates to splined gear and shaft constructions and more particularly to anti-rattle means for eliminating oscillation between the gear and the shaft when the gear is running free with the shaft.

Conventional vehicle transmissions are usually provided with a splined main shaft having a plurality of gears slidably disposed thereon which are actuated by shifter forks to accomplish various changes in transmission speeds. Ordinarily the gears are formed with an internally splined hub which slidably fits over the external splines of the main shaft. Since such gears must be freely slidable longitudinally of the main shaft to assure ease of shifting from one speed to another, reasonable tolerances must be allowed between the internal splines of the gear and the external splines of the main shaft.

In the past it has been found that when the internal splines of a gear are provided with sufficient tolerance to permit the necessary freedom of longitudinal movement, the gears have a tendency to rattle or oscillate on the shaft when running under a no load condition, as when one of the other speed reduction gears is employed to transmit the power. Under certain circumstances the chatter or rattle of the free running gear produces highly objectionable noises in the vehicle.

One object of the present invention is to provide means for dampening or eliminating the rattle of gears running free on a rotating splined shaft.

Another object is to provide circumferentially disposed resilient anti-rattle means coincidentally engaging an externally splined shaft and an internally splined gear slidably disposed on the shaft.

Still another object is to provide an anti-rattle device of the type described which requires no alteration of the respective spline profiles of the gear and shaft.

A further object is to provide an anti-rattle device of the type described which is particularly suitable for rapid assembly.

A still further object is to provide an anti-rattle device of the type described which is low in cost, simple to fabricate and efficient in operation.

These and other objects of the invention will become more fully apparent as reference is had to the accompanying drawings wherein:

Fig. 1 is a side elevational view, with parts broken away and partly in section, showing a portion of the main shaft of a transmission, one of the reduction gears slidably disposed thereon and the anti-rattle means disposed in position.

Fig. 2 is an enlarged fragmentary sectional view of a portion of the gear and main shaft assembly illustrated in Fig. 1.

Fig. 3 is a fragmentary front elevational view, partly in section, showing the disposition of the resilient anti-rattle device in the gear prior to assembly on the main shaft and Fig. 4 is a front elevational view taken substantially along the line 4—4 of Fig. 1 showing the assembled position of the resilient anti-rattle device with respect to the splined gear and main shaft.

Referring now to the drawings and particularly Fig. 1 there is shown a portion of a transmission wherein the numeral 2 designates the main shaft. Main shaft 2 is provided with an enlarged portion 4 which is adapted to engage a gear 6, in a manner to be described. Enlarged portion 4 is splined by cutting a plurality of longitudinally extending grooves 8 therein. Grooves 8 are spaced apart sufficiently to provide lands 10 of approximately double the width of the grooves 8, thus providing a modified form of a conventional splined shaft. Gear 6 is provided with an internally splined hub portion 12 and is slidably disposed on enlarged splined portion 4. The internal splines of hub portion 12 are formed by boring out and broaching the hub to form a plurality of alternating spaced apart longitudinally extending ribs 14 and 16. Ribs 14 extend radially inwardly a greater distance than ribs 16 and are adapted to engage each of the spaced apart grooves 8 formed in the splined portion 4 of main shaft 2, while ribs 16 extend radially inwardly into contact with the relatively wide lands 10 of splined portion 4.

To eliminate or dampen any rattling resulting from the normal looseness of fit between the internally splined hub 12 and splined portion 4 of the main shaft, the hub 12 is provided with an internal circumferential undercut or groove 18 in the midportion thereof. An open ended circular ring 20 is disposed within the groove 18 and is adapted to yieldingly engage an oil resistant circular rubber strip 22 disposed at the base of the groove 18. Formed integrally on the inner periphery of ring 20 are a plurality of lugs 24 and 26 which are adapted to extend radially inwardly and grip certain of the grooves 8 in the splined portion 4 of main shaft 2, when the gear is in position on the shaft 2. As seen best in Fig. 4, the ring 20 normally assumes the contracted position shown in dotted lines. In its contracted position ring 20 has an inside diameter somewhat less than the outside diameter of enlarged portion 4. Upon installation of the gear 6 on splined portion 4, the effective diameter of ring 20 is caused to increase as the lugs 26 at the open ends of the ring 20 are forced radially outwardly into alignment with their respective grooves 8 in splined portion 4, as shown in solid lines in Fig. 4. It will be apparent that when the lugs 26 are in alignment with their respective grooves 8, all the lugs 24 and 26 register with their respective grooves 8 and permit the splined hub 12 to slidably move along the splined portion 4 of the main shaft. In assembled position, the lugs 26 on ring 20 tend to grip the respective grooves 8 in splined portion 4, due to the tendency of the ring 20 to return to the normal contracted position previously mentioned. Since the outside diameter of the smooth outer periphery 28 of the ring 20 is only slightly smaller than the inside diameter of the groove 18, when the ring 20 is expanded by slidably positioning the gear 6 over splined portion 4, the outer periphery 28 will slightly compress resilient rubber strip 22 and cause resilient gripping engagement therewith. To provide additional gripping engagement between groove 18 and ring 20, the body of ring 20 is formed in a wavy configuration, as shown in dotted lines in Fig. 1. Because of this configuration, the effective width of ring 20 is normally greater than the width of the groove 18. Therefore ring 20 will alternately engage the sides 30 and 32 of groove 18 and provide additional resilient gripping engagement throughout the entire circumference of the groove.

It will be noted that by virtue of the circumferential disposition of resilient ring 20, no modification or alteration of the normal splines or tolerances thereof are required. In addition, should it on occasion become necessary to remove a gear from the main shaft, the resilient ring remains in position in the groove 18 for subsequent reinstallation, since the groove is sufficiently deep to retain the ring 20 even in the normal contracted position.

While the invention has been shown as applied to a modified spline profile, it is apparent that it will function equally well with conventional splining having equally spaced lands and grooves.

From the foregoing it will be seen that there has been provided an anti-rattle device which is low in cost, simple in construction, highly efficient in operation and easy to assemble. In addition the device may be applied to any conventional sliding splined connection merely by adding a circumferential groove in the hub of the sliding member.

While but a single embodiment of the invention has been shown and described it will be apparent that other changes and modifications may be made therein. It is, therefore, not intended to limit the invention to the embodiment illustrated but only by the scope of the claims which follow.

I claim:

1. In combination, an externally splined shaft, a gear having a bore formed therein, said bore being splined to slidably fit said externally splined shaft, and resilient means interposed between said bore and said externally splined shaft to resist oscillation of said gear on said shaft, said resilient means extending continuously around substantially the entire circumference of said shaft.

2. In combination, an externally splined shaft, an internally splined gear having a circumferential groove formed therein, said gear being adapted for freely slidable movement longitudinally of said splined shaft, and an axially and radially flexible circular ring disposed in said groove, said ring being adapted to resiliently engage said gear and said shaft coincidentally to prevent oscillation therebetween.

3. In combination, an externally splined shaft, a gear, said gear having a splined aperture and being provided with an annular groove in the midportion of said splined aperture, an open ended circular ring disposed in said groove and adapted for gripping engagement with said splined shaft and said gear to eliminate oscillation of said gear on said shaft.

4. In combination, an externally splined shaft, a gear having an internally splined bore adapted to slidably fit said shaft, said bore being provided with a relatively narrow annular groove substantially midway thereof, and resilient means positioned in said groove, said resilient means being adapted to expand radially when said gear is disposed on said shaft to resiliently grip said gear and said shaft coincidentally to eliminate oscillation of said gear on said shaft.

5. In combination, an externally splined shaft, an internally splined gear having an annular groove formed therein, said gear being adapted for freely slidable movement longitudinally along said splined shaft, a relatively compressible strip extending around said groove at the base thereof, spring means disposed in said groove and extending around substantially the entire circumference thereof, said spring means being adapted to yieldably engage said shaft and said compressible strip coincidentally to prevent oscillation of said gear on said shaft.

6. The combination set forth in claim 5 wherein said spring means comprises a relatively thin substantially circular open ended ring having a plurality of inwardly extending lugs formed integrally thereon.

7. The combination set forth in claim 5 wherein said spring means comprises a relatively thin substantially circular open ended ring having a plurality of inwardly extending lugs formed integrally thereon, said ring being provided with axially alternately indentations.

8. The combination set forth in claim 5 wherein said spring means comprises a circumferentially undulated relatively thin open ended ring having a relatively smooth outer periphery and a notched inner periphery.

9. The combination set forth in claim 5 wherein said spring means comprises a relatively thin substantially circular open ended ring, said ring being yieldable both axially and radially.

10. In combination, an externally splined shaft, a gear, said gear having a splined aperture and being provided with an annular groove in the midportion of said splined aperture, flexible means disposed at the base of said groove throughout the circumference thereof, an open ended circular ring disposed in said groove, said ring being provided with a relatively smooth outer periphery and having a plurality of spaced lugs on its inner periphery, said ring being adapted to expand radially when said gear is disposed on said shaft whereby said spaced lugs grip said splined shaft and said smooth outer periphery simultaneously compresses said resilient means to dampen oscillation of said gear on said shaft.

References Cited in the file of this patent

UNITED STATES PATENTS

| | | |
|---|---|---|
| 1,758,692 | England | May 13, 1930 |
| 1,804,906 | Wemp | May 12, 1931 |
| 1,813,209 | Spase | July 7, 1931 |
| 2,552,005 | Fike | May 8, 1951 |
| 2,625,415 | Smith | Jan. 13, 1953 |